United States Patent
Maruo et al.

(10) Patent No.: US 6,271,874 B1
(45) Date of Patent: Aug. 7, 2001

(54) ELECTROPHOTOGRAPHIC PRINTER HAVING AN IMAGE MEMORY, A HORIZONTAL SCANNING FRINGE CORRECTION EXPOSURE DETERMINING SECTION, A VERTICAL SCANNING FRINGE CORRECTION EXPOSURE DETERMINING SECTION, AND A SWITCH

(75) Inventors: Seiji Maruo; Shinichi Akatsu; Hiroyuki Mabuchi; Teruaki Mitsuya; Shinya Kobayashi, all of Ibaraki (JP)

(73) Assignees: Hitachi Koki Co., Ltd.; Hitachi, Ltd., both of Tokyo (JP)

( * ) Notice: Subject to any disclaimer, the term of this patent is extended or adjusted under 35 U.S.C. 154(b) by 0 days.

(21) Appl. No.: 09/548,634

(22) Filed: Apr. 12, 2000

(30) Foreign Application Priority Data

Apr. 15, 1999 (JP) .................................................. 11-107535

(51) Int. Cl.⁷ ................................. B41J 2/435; B41J 2/47
(52) U.S. Cl. ............................................................. 347/240
(58) Field of Search ................................... 347/240, 251, 347/252, 237, 232

(56) References Cited

U.S. PATENT DOCUMENTS

| | | | |
|---|---|---|---|
| 5,751,437 | * | 5/1998 | Parker et al. .................... 347/232 X |
| 5,869,214 | * | 2/1999 | Anzai et al. . |
| 5,884,119 | * | 3/1999 | Maruo et al. . |
| 6,061,534 | * | 5/2000 | Okada et al. . |

FOREIGN PATENT DOCUMENTS

| | | | |
|---|---|---|---|
| 10-39573 | * | 2/1998 | (JP) . |
| 11-184205 | * | 7/1999 | (JP) . |

* cited by examiner

Primary Examiner—Susan S. Y. Lee
(74) Attorney, Agent, or Firm—Sughrue, Mion, Zinn, Macpeak & Seas, PLLC

(57) ABSTRACT

An image memory for storing input image data by plural lines, a horizontal scanning fringe correction exposure determining section for determining a fringe between close vertical lines in a horizontal scanning direction in the image data, a vertical scanning fringe correction exposure determining section for determining a fringe at the lower end of an image in a vertical scanning direction and a switch for selecting at least three laser drivers are provided.

5 Claims, 5 Drawing Sheets

FIG. 2

| BASIC PATTERN | IMAGE OF ADJACENT BLACK VERTICAL LINES (REVERSE DEVELOPING) | IMAGE OF ADJACENT COLOR (RED) VERTICAL LINES (NORMAL DEVELOPING) |
|---|---|---|
| 1 | 71, 73, 74, 76 | 72, 75 |
| 2 | 73, 71, 74 | 71, 74, 75 |
| 3 | 72, 73, 74, 73, 75, 74 | 72, 75, 74 |
| 4 | 73, 71, 74 | 75, 71, 74, 75 |
| 5 | 72, 73, 74, 73, 75, 74 | 75, 72, 75 |
| 6 | 72, 75, 71, 73, 74 | 71, 74, 71, 74, 75 |
| 7 | 72, 75, 72, 73, 75, 74 | 71, 74, 72, 75 |

FIG. 3

| BASIC PATTERN | IMAGE OF ADJACENT BLACK VERTICAL LINES (REVERSE DEVELOPING) | IMAGE OF ADJACENT COLOR (RED) VERTICAL LINES (NORMAL DEVELOPING) |
|---|---|---|
| 8 | THE NUMBER OF PREDETERMINED DOTS (72, 75, 71, 73, 74) | THE NUMBER OF PREDETERMINED DOTS (71, 74, 75) |
| 9 | (72, 75, 73, 74, 75, 74) | (71, 74, 72, 75) |

EXPOSURE CONTROL PRIORITY
BLACK IMAGE > RED IMAGE > BLACK FRINGE CORRECTION (UNDER RED IMAGE)
> ADJACENT BLACK LINES CORRECTION
> RED FRINGE CORRECTION (UNDER BLACK IMAGE)

ELECTROPHOTOGRAPHIC PRINTER HAVING AN IMAGE MEMORY, A HORIZONTAL SCANNING FRINGE CORRECTION EXPOSURE DETERMINING SECTION, A VERTICAL SCANNING FRINGE CORRECTION EXPOSURE DETERMINING SECTION, AND A SWITCH

BACKGROUND OF THE INVENTION

1. Field of the Invention

The present invention relates to a laser light amount control method of a semiconductor laser scanner used for a writing head of a laser beam printer and a digital copying machine, particularly relates to a laser light amount control method in a tri-level developing system of forming a normal latent image and a reverse latent image by one exposure to execute two-color developing.

2. Description of the Related Art

In a conventional laser printer, a method of developing one color of toner by one laser scanning beam is used. Recently, for one of methods for the color laser printer, a tri-level developing method is developed, in which a method is used for forming by one laser scanning beam a normal developing latent image, a reverse developing latent image and an intermediate potential latent image in which neither a normal developing nor a reverse developing is executed, thereby developing two colors of toner at a time.

In an electrophotographic process, when an electrostatic latent image is formed on a photosensitive drum, an electric field polarized opposite to the polarity of the latent image is generated in the circumference of the latent image in addition to an electric field for highlighting developing generated at the end of the latent image. In the conventional one-color developing, when an image is formed, field reversing does not matter. However, in the tri-level process in which positive and negative electrostatic latent images are formed on the photosensitive drum and the developing of two colors of toner such as red toner and black toner polarized opposite to the polarity of the respective latent images is executed, special developing (hereinafter called fringe developing) occurs that red toner adheres around a black image and black toner adheres around a red image because of field reversing. Therefore, a problem arises that the quality of a two-color image is remarkably deteriorated.

The fringe phenomenon remarkably emerges in a solid image. Though the situation of the emergence is different at the top end and at the back end in the rotational direction of the photosensitive drum, the fringe phenomenon particularly arises at the back end. Heretofore, efforts to reduce a fringe at the back end have been made.

For a method of reducing the fringe, there is a method of reducing the fringe by using various exposure controls for trade-off relations among the fringe, the adhesion of a carrier and a printing density, which is a theme of tri-level developing. Specifically, there is a method of controlling an electric potential field in steps around an image by controlling the exposure amount to improve the surface of the photosensitive drum.

The fringe has been reduced by controlling the exposure amount under the aforementioned background. In case of the reduction of the fringe, as described above, the exposure amount control has been focused at the back end of the solid image in which the fringe phenomenon is remarkable.

However, as the experiments are made, it has proved that another correction is also necessary for a new fringe phenomenon arising between close vertical lines because the fringe phenomenon is remarkable not only at the back end of the solid image but between the close vertical lines.

Moreover, in case that a reverse image and a normal image are adjacent in the horizontal scanning direction, the correction control generates an unnecessary image turbulence in a portion to which the correction exposure is applied under a solid part under a part between the adjacent images.

SUMMARY OF THE INVENTION

It is an object of the present invention to provide an electrophotographic apparatus wherein a new fringe phenomenon described above is prevented.

It is also an object of the invention to provide an electrophotographic apparatus wherein the turbulence of an image is prevented.

To achieve the above objects, there is provided an electrophotographic apparatus using a tri-level developing method for developing at least two colors of toner by one exposure, the electrophotographic apparatus comprising: an exposure device for exposing on a photosensitive drum, a horizontal scanning fringe correction exposure determining section for determining a fringe between close vertical lines in a horizontal scanning direction in input image data, and a vertical scanning fringe correction exposure determining section for determining a fringe at the lower end of an image in a vertical scanning direction.

BRIEF DESCRIPTION OF THE DRAWINGS

FIG. 2 is an explanatory drawing for explaining basic patterns for fringe correction control according to the invention.

FIG. 3 is an explanatory drawing for explaining basic patterns for fringe correction control according to the invention.

DETAILED DESCRIPTION OF THE PRESENT INVENTION

Under the description in the item of the related art, we have performed a concentrated control at the back end of a solid image where a fringe phenomenon is remarkable by controlling the exposure. However, as experiments are continued, another correction has been required because a fringe phenomenon is remarkable not only at the back end of a solid image but between close vertical lines (in a white part between images of the same color adjacent in a horizontal scanning direction). This reason is that though in the horizontal scanning direction, an electric field is independently not large enough to develop a fringe, respective developing electric fields are added when images are close to an extent that the fringe is formed. An embodiment for inhibiting the new fringe developing which is the object of the invention will be described below with reference to the accompanying drawings.

Figure 6:
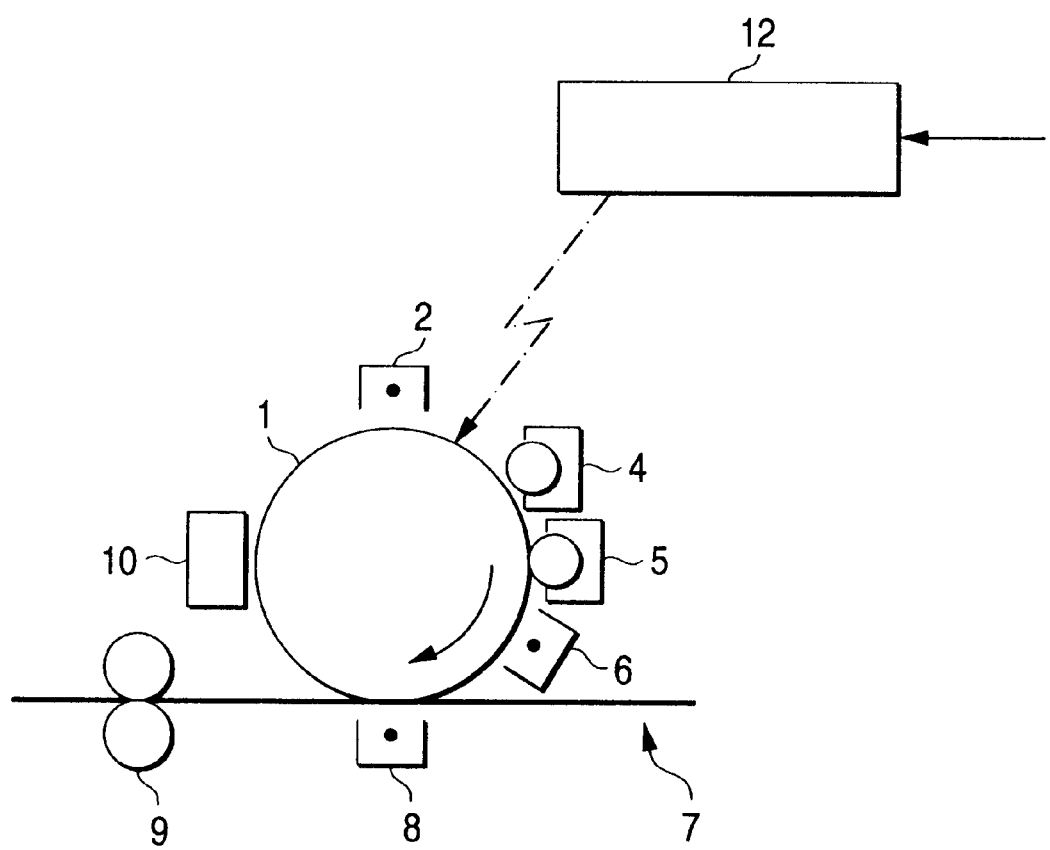
FIG. 6 shows an embodiment of an electrophotographic printer according to the invention.

FIG. 6 shows an embodiment of the whole configuration of an electrophotographic apparatus (a laser printer) according to the invention. In the laser printer, an exposure device 12 exposes a photosensitive drum 1 after evenly charging the photosensitive drum 1 by a charger 2 to form an electrostatic latent image. Afterward, the laser printer develops the latent image with two colors of toner by two developing devices 4 and 5 in a tri-level developing process described later. The two colors of toner developed on the photosensitive drum 1 are polarized so that the two colors of toner has the same polarity by a before-transfer-charger 6 because the two colors of the toner is different in electrification polarity. Then, a toner image is transferred on a paper 7 by a transfer device 8 and the toner is melted and fixed by a fixing device 9. Also, the toner left on the photosensitive drum 1 is removed by a cleaner 10 and a series of process is finished.

Figure 1:
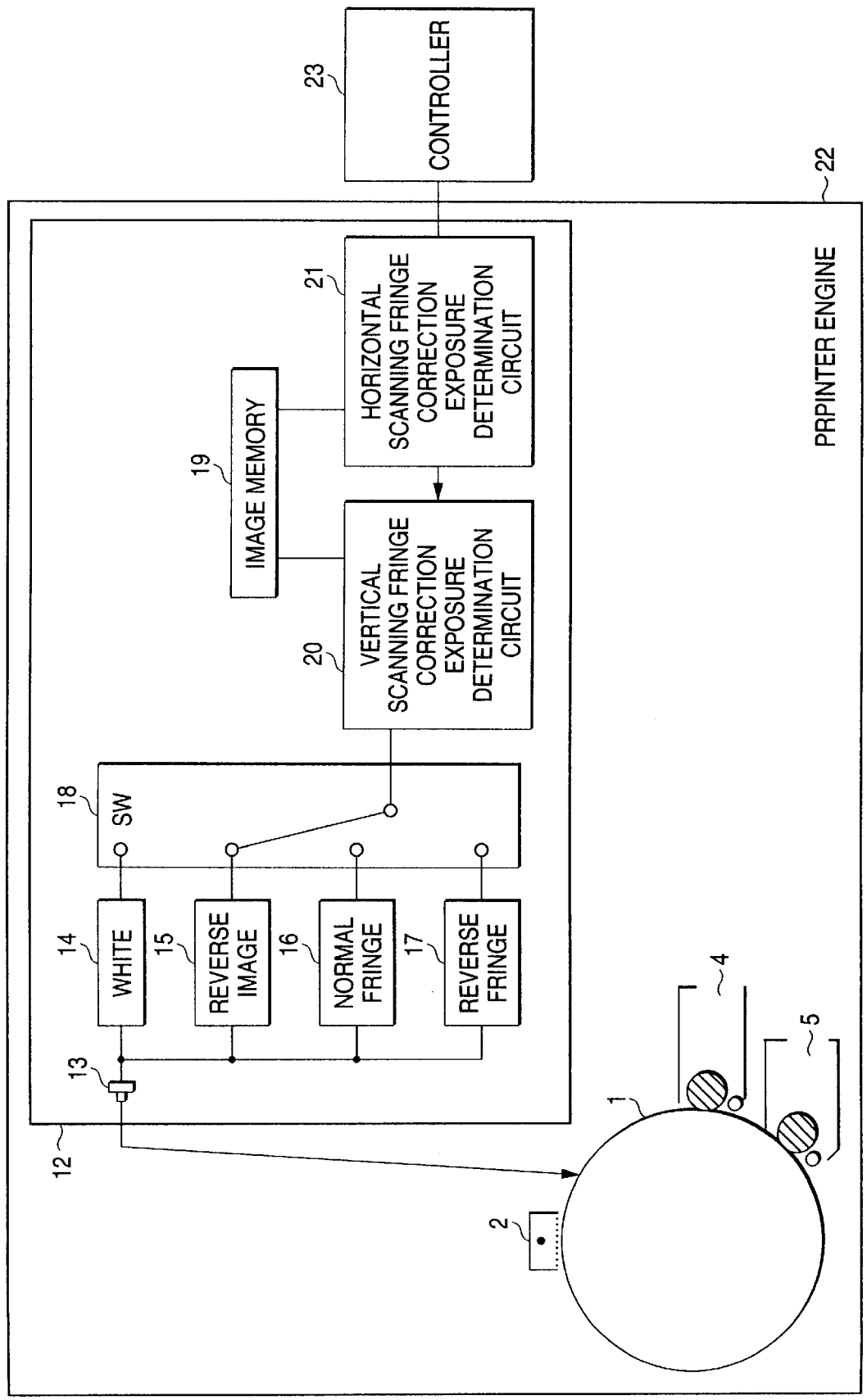
FIG. 1 is a view showing an embodiment of an exposure device of an electrophotographic printer according to the invention.

FIG. 1 is an explanatory drawing for explaining an embodiment of the exposure device for correcting the fringe in the electrophotographic apparatus according to the invention.

For a recording device according to the invention, a printer engine 22 with the exposure device and a controller 23 for controlling the engine are provided. The exposure device 12 comprises a laser 13, a switch 18 for selecting a normal fringe driver 16 of a fringe correction driver, a reverse fringe driver 17 thereof, a white part driver 14, a reverse image driver 15 and a fringe correction determining circuit for determining a condition for operating them. The normal fringe driver 16 corrects a fringe generated around a reverse image by the normal developing and the reverse fringe driver 17 corrects a fringe generated around a normal image by the reverse developing.

The fringe correction determining circuit is characteristic of the present invention. The fringe correction determination circuit comprises a vertical scanning fringe correction exposure determining circuit 20 and a horizontal scanning fringe correction exposure determining circuit 21, between which an image memory 19 is provided. The horizontal scanning fringe correction exposure determining circuit 21 determines a fringe between the close vertical lines in the horizontal scanning direction and the vertical scanning fringe correction exposure determining circuit 20 determines a fringe at the lower end of an image in the vertical scanning direction utilizing the result of the determination.

A determination condition (distance between close vertical lines at which a fringe is caused) in the horizontal scanning direction depends on a condition under which the fringe in the horizontal scanning direction is highlighted. This reason is that a range in which a developing electric field is intensified is different depending on a developing condition such as the resistance value of developer, a developing gap and a developing method and the like. In case that distance between close vertical lines in the horizontal scanning direction is 0.1 to 5.0 mm or shorter, the fringe correction is required. The numeric value depending on the electrophotographic printer can be readily acquired in a printing experiment actually using the electrophotographic printer.

According to the above configuration, not only the conventional fringe correction at the lower end of the image but also the fringe correction between close vertical lines can be conducted so that higher image quality can be acquired.

The determination condition (distance between close vertical lines at which the fringe is caused) described in this embodiment of the horizontal scanning fringe correction exposure determining circuit 21 is different and may be varied depending on the developing condition as described above. However, as discrimination is enabled in a one-dimensional horizontal scanning direction, because quantity of hardware increased for the variation is not so much, flexible correspondences according to the conditions are enabled.

Figure 4:
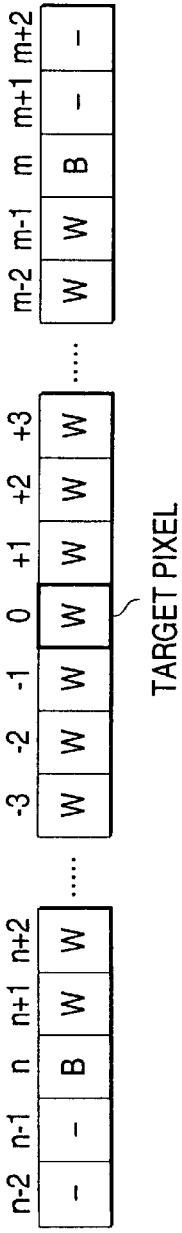
FIG. 4 shows an embodiment showing the contents of discrimination between adjacent longitudinal lines.

FIG. 4 shows the contents of the determination of the horizontal scanning fringe correction exposure. Each square continuing laterally shows a pixel in a horizontal scanning direction and a digit over each pixel shows the sequence of pixels. The object of determination is a target pixel (sequence 0), sequence −1, −2, −3, continue in the left of the target pixel and sequence +1, +2, +3, . . . continue in the right. Image data is shown in each square. "W" denotes white data, "B" denotes black data and "−" denotes arbitrary data. Here, a determination condition (distance between the close vertical lines at which the fringe is caused) is supposed for L pieces of pixels. If the following expression (1) is satisfyed, it is determined that the determination condition is satisfied:

$$m-n-2>L \tag{1}$$

where
"W" is the pixel data of the target pixel;
"m" is the sequence of a first pixel of which the pixel data is B in the right for the first time, and
"n" is the sequence of a first pixel of which the pixel data is B in the left for the first time.

The case holding true for the condition is hereinafter regarded as a correction pixel between adjacent vertical lines.

In this embodiment, a method of discriminating only the reverse image and executing the correction control is adopted. The correction of both a normal pixel and a reverse pixel is convincing, however, in this embodiment, color data (C) is adopted as normal developing and black data (B) is adopted as a reverse image. In normal developing, the contrast of a normal latent image with a white part (intermediate potential) decreases and a fringe electric field weakens by adopting the hardware configuration. According to this method, the scale of circuits can be reduced and this method is superior in simplicity and the cost.

As described above, in this embodiment, the fringe correction control is applied to the white data under the solid black data (at the lower end of a black image), the white data under the solid color image (at the lower end of a red image) and the white data between the black data adjacent in the horizontal scanning direction (between adjacent vertical lines).

FIGS. 2 and 3 show basic patterns adopted in this embodiment for the fringe correction control between adjacent vertical lines and at the lower end of the image. Speaking in detail, they show the contents of the exposure control according to patterns produced by a black image 71 and a red image 72. That is, the upper side is equivalent to the top end of an image and the lower side is equivalent to the back end of the image.

The condition of the exposure is based upon the black image 71, the red image 72, black fringe (under the red image) correction 75, correction between black lines (between adjacent vertical lines) 73, red fringe (under a black image) correction 74 and the white image. At this time, the control is applied in the order of the black image (a reverse developing image) 71, the red image (a normal developing image) 72, the black fringe (at the lower end of a normal image) correction 75, the correction between black lines (between adjacent reverse developing images) 73 and the red fringe (at the lower end of a black image) correction 74. Specifically, the four laser drivers shown in FIG. 1 of the white part driver 14, the reverse image driver 15, the normal fringe driver 16 and the reverse fringe driver 17 are selected.

This embodiment is characterized in that, as clear from the pattern 1, the exposure control is also applied to a part to be corrected between adjacent vertical lines as at the lower end of an image. This reason is that, as clear from the result of experiments, in case that the correction control is applied between the adjacent vertical lines, the more satisfactory result of the correction is acquired when the adjacent vertical lines are treated including an image part as a solid image. A more satisfactory image can be acquired by the aforementioned correction than correction between adjacent vertical lines and correction at the lower end of an image are simply executed.

Therefore, the fringe of color toner is first determined by the horizontal scanning fringe correction exposure determining section, the image data corrected according to the determination is stored in the image memory as black image data. A fringe of black toner is determined based upon the stored image data by the vertical scanning fringe correction exposure determining section. Hereby, as a new circuit for determining a part under a corrected part between adjacent vertical lines is not required, the circuit does not become complicated. According to the aforementioned correction, the exposure correction control shown in FIG. 1 is required to be executed by the horizontal scanning fringe correction exposure determining circuit 21 and the vertical scanning fringe correction exposure determining circuit 20 via the image memory 19. Also, the reason why both circuits 20 and 21 are connected is that as the reverse image laser driver 15 is driven for black image data, it is required in addition to corrected black data.

An example in FIG. 2 (a basic pattern 5, between adjacent black vertical lines) will be in detail described below. For an image, a red image is put in downward U-shaped black. In order of priorities, the black image 71 and the red image 72 are first determined. Next, the black fringe (under the red image) correction 75 is determined. Next, correction between the black lines 73 is determined. It proves that at the lower end of the U shape of the black image, the black fringe correction 75 takes precedence. The red fringe correction 74 is finally determined under correction between black lines 73 and the black image 71 respectively put together.

Figure 5:
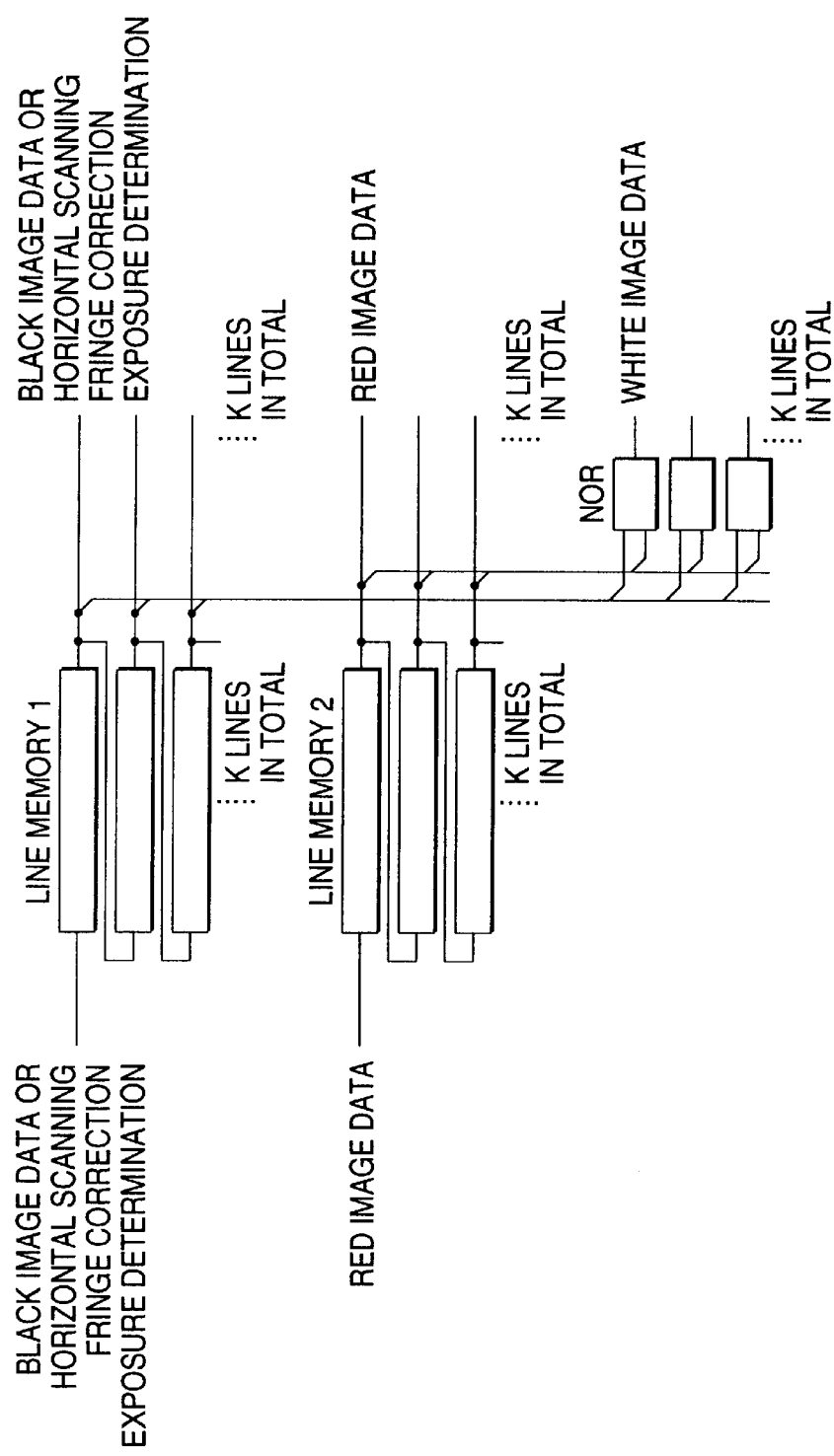
FIG. 5 shows an embodiment of the inside of an image memory according to the invention.

FIG. 5 shows configuration of the image memory. A determination condition (distance under an image at which a fringe is caused) in the vertical scanning direction depends upon a condition under which a fringe in the vertical scanning direction is highlighted. This reason is that a range in which a developing electric field is intensified is different depending upon a developing condition such as the resistance value of the developer, the developing gap and the developing method and the like. In case distance under an image in a vertical scanning direction is 0.1 to 5.0 mm or shorter, the fringe correction is required. The numeric value depending upon the electrophotographic printer can be readily acquired by actual printing experiments by the electrophotographic printer. In this embodiment, the determination condition (distance under an image at which the fringe is caused) is supposed for K lines.

The black image data and the horizontal scanning fringe correction exposure determined data are summed in logical (OR) and is input to a line memory 1. The line memory 1 has capacity for K lines and sequentially outputs data to every line. A red image data is input to a line memory 2. The line memory 2 also has capacity for K lines and sequentially outputs data to every line. White image data is acquired for K lines by reverse-summing in logical (NOR) their outputs. Image lower end correction control is applied to a white pixel until a black or red pixel first emerges under black and red images based upon their data.

For the concrete contents of correction exposure, a fringe between adjacent vertical lines determined by the horizontal scanning fringe correction exposure determining circuit 21 is evenly exposed by predetermined quantity (approximately 1.2 to 1.3 times of intermediate potential exposure). This is to uniformly weaken an intensified developing electric field. A satisfactory image free of a fringe can be acquired by executing such control. For a fringe under an image determined by the vertical scanning fringe correction exposure determining circuit 20, the whole corrected area may be also evenly exposed by the predetermined quantity and an exposure value may be also gradually varied according to distance from an image in a vertical scanning direction. Means for varying is required to be a well-known device that can emit an analog wave according to an instruction from any of the laser drivers 14 to 17 such as a digital-to-analog converter.

Next, a method equivalent to the second object of the invention of controlling a phenomenon that the unnecessary disturbance of an image occurs in a part to which correction exposure is applied under a solid part under a part between the following adjacent images by correction control in case a reverse image and a normal image exist adjacently in a horizontal scanning direction will be described.

This phenomenon occurs because the correction exposure is applied to an originally uniform white (intermediate potential) part for a reason that the part is located under the solid part. For example, in a boundary changing from under a red image to under a black image even if the parts are similarly white images, the light amount changes by ±20 to 30% on one side, the light amount changes by approximately 40 to 60% in total based upon an intermediate exposure value and the developed image is disturbed by the phenomenon and the developing characteristic. For a countermeasure, it is decided that an area where a part under a reverse image determined as a fringe and a part under a normal image determined as a fringe are adjacent in the horizontal scanning direction is determined and no fringe correction exposure is applied to the area. A concrete circuit detects a point where a part under the reverse image determined as the fringe and a part under the normal image determined as the fringe continue in the horizontal scanning direction as in correction between longitudinal lines and determines a few dots before and after the point as an adjacent area.

The variation of rapid electric potential (a rapid electrical field) caused by the exposure under the reverse image, exposure on the white (intermediate potential) part and correction exposure the normal image can be method and a satisfactory image free of disturbance can be acquired.

According to the invention, the fringe phenomenon at the back end of an image and between close vertical lines configuration and the electrophotographic printer free of the disturbance of an image can be provided.

What is claimed is:

1. An electrophotographic apparatus for a tri-level developing method of developing at least two colors of toner by one exposure, the electrophotographic apparatus comprising:

an image memory for storing a plurality of lines of image data;

a horizontal scanning fringe correction exposure determining section for determining a fringe between close vertical lines in a horizontal scanning direction in the image data;

a vertical scanning fringe correction exposure determining section for determining a fringe at a lower end of an image in a vertical scanning direction; and a switch, for selecting at least three laser drivers, operatively coupled to at least one of the image memory, the horizontal scanning fringe correction exposure determining section, and the vertical scanning fringe correction exposure determining section.

2. The electrophotographic apparatus as claimed in claim 1, the electrophotographic apparatus for the tri-level developing method of developing black toner and at least one color toner other than the black toner by one exposure, wherein the horizontal scanning fringe correction exposure determining section determines the fringe of the color toner caused between close vertical lines of the black toner in the horizontal scanning direction in the image data; and the vertical scanning fringe correction exposure determining section determines the fringe of the color toner and the black toner at the lower end of a black toner image and a color toner image in the vertical scanning direction.

3. The electrophotographic apparatus as claimed in claim 1, wherein:

in case the results of determination by the horizontal scanning fringe correction exposure determining section and the vertical scanning fringe correction exposure determining section are overlapped, a priority order is given in order of the determination of the fringe of black toner by the vertical scanning fringe correction exposure determining section, the determination of the fringe of the color toner by the horizontal scanning fringe correction exposure determining section and the determination of the fringe of the color toner by the vertical scanning fringe correction exposure determining section.

4. The electrophotographic apparatus as claimed in claim 1, further comprising:

means for storing black image data in the image memory, the black image data being image data corrected by the determination of the fringe of color toner by the horizontal scanning fringe correction exposure determining section, wherein the fringe of the color toner is determined based upon the image data stored by the vertical scanning fringe correction exposure determining section.

5. The electrophotographic apparatus as claimed in claim 1, wherein:

the vertical scanning fringe correction exposure determining section comprises means for determining an area in which a part determined as the fringe at the lower end of a reverse image and a part determined as the fringe at the lower end of a normal image are adjacent in the horizontal scanning direction.

* * * * *